Patented Oct. 28, 1952

2,615,913

UNITED STATES PATENT OFFICE 2,615,913

AROMATIC SULFONIC ACID ESTERS CONTAINING AN AMINO GROUP

Willy Widmer, Bottmingen, and Alfred Fasciati, Basel, Switzerland, assignors to Ciba Limited, Basel, Switzerland, a Swiss firm No Drawing. Application June 19, 1951, Serial No. 232,448. In Switzerland July 18, 1949

3 Claims. (Cl. 260—456)

This application is a continuation in part of our application Serial No. 165,605, filed June 1, 1950, now abandoned.

According to this invention valuable new aromatic sulfonic acid esters containing an amino group are made by reacting a compound of the general formula

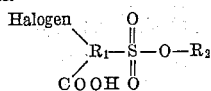

in which $R_1$ represents a benzene radical in which the halogen atom and the substituent —COOH are in ortho-position relatively to each other, and $R_2$ represents a benzene radical containing a carboxy group, with ammonia, at a temperature exceeding 100° C., in the presence of metallic copper.

The halogen atom in the compound of the above general formula may be, for example, a bromine atom or advantageously a chlorine atom. The radical $R_2$ may contain other substituents than the carboxy group, for example, a methyl group or a chlorine atom.

The substituents halogen and COOH are in ortho-position relatively to each other in the benzene radical $R_1$, and the carboxy group in the radical $R_2$ is preferably in o-position relatively to the

linkage. The radical —$SO_2$—O—$R_2$ may be bound to the benzene radical $R_1$ in any desired position, for example, in para-position relatively to the substituent COOH or to the halogen atom. Some of the compounds of the last mentioned constitution are of special interest as starting materials for the present invention owing to their ready accessibility.

The compounds of the formulae

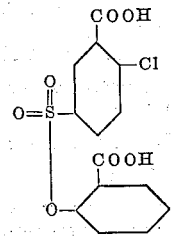

and

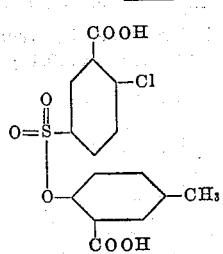

are valuable starting materials.

The compounds corresponding to the general formula first mentioned above can be prepared by methods in themselves known. Thus, for example, sulfonic acid chlorides of the general formula

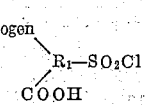

in which $R_1$ has the meaning given above, may be reacted with hydroxybenzoic acids such as 1-hydroxybenzene-2-carboxylic acid or 1-hydroxy-4-methyl-benzene-2-carboxylic acid by the usual methods of esterification.

As examples of compounds of the formula first mentioned above, which are used as starting materials in the present invention, there may be mentioned: 2 - chlorobenzene - 5 - sulfonic acid phenyl ester-1:2'-dicarboxylic acid, and 2-chlorobenzene-5-sulfonic acid - (4' - methyl- or 4'-chloro)-phenyl ester-1:2'-dicarboxylic acid.

The reaction with ammonia in accordance with the present process is advantageously carried out by using a considerable excess of ammonia above the quantity theoretically required, and working in an aqueous or alcoholic medium, but with as high a concentration of ammonia as possible. The reaction is conducted at temperatures above 100° C., for example, at temperatures ranging from 110–130° C., and advantageously in a closed vessel. In order to obtain a smooth reaction a small quantity of metallic copper is to be added.

Good results are generally obtained by mixing the sulfonic acid ester to be used as starting material with a large excess of an aqueous ammonia solution of 20–30 per cent. strength with the addition of a little copper powder, and carrying out the reaction in a stirring autoclave for several hours at the necessary temperature.

The aromatic sulfonic acid esters containing an amino group obtainable by the present process are new and correspond to the general formula

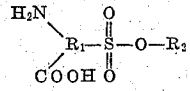

in which $R_1$ represents a benzene radical in which the substituents $H_2N$— and —COOH are in ortho-position relatively to one another, $R_2$ represents a benzene radical containing a carboxy group.

These sulfonic acid esters are valuable intermediate products which can be used, for example, as diazo components for the preparation of azo dyestuffs.

It was not to be expected that the halogenated sulfonic acid esters used as starting materials in the present process could be converted in very good yield into the corresponding sulfonic acid esters containing an amino group by the action of ammonia without the ester group being attacked.

The following example illustrates the invention, the parts and percentages being by weight unless otherwise stated and the relationship of parts by weight to parts by volume being the same as that of the kilogram to the liter.

*Example*

156.5 parts of 2-chlorobenzene-1-carboxylic acid are slowly introduced at room temperature while stirring into 350.0 parts of chlorosulfonic acid, and the mixture is heated at 95–100° C. for 4 hours. The solution so obtained is then poured on to 1500 parts of ice, while stirring, and the resulting white precipitate of 2-chlorobenzene-5-sulfonic acid chloride-1-carboxylic acid is separated by filtering with suction and washed with ice water.

The 2-chlorobenzene-5-sulfonic acid chloride-1-carboxylic acid so obtained is suspended in 1000 parts of ice water and mixed with 138.0 parts of 2-hydroxybenzene-1-carboxylic acid. To the suspension, while it is energetically stirred, a sodium hydroxide solution of 30 per cent. strength is slowly introduced in portions until the reaction is slightly but permanently alkaline to phenol phthalein. The temperature rises during the addition to 35° C. The whole is allowed to cool from 35° C. to 20° C. for a few hours while stirring. The resulting solution is then acidified with concentrated hydrochloric acid, and the precipitated product is separated by filtration and washed with water. The dried product is treated with 600 parts by volume of ammonia solution of 24 per cent. strength and 4 parts of copper powder for 2 hours at 125–130° C. in an autoclave.

The brownish solution so obtained is acidified with hydrochloric acid, and the precipitated product is separated by filtration, washed with water and dried.

The resulting 2-aminobenzene-5-sulfonic acid phenyl ester-1:2'-dicarboxylic acid of the formula

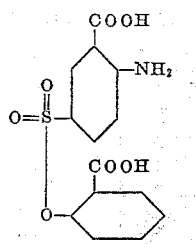

is a pale grey-brown powder which dissolves very easily in dilute alkalis. It may be used for the preparation of azo dyestuffs, for example, in the following manner:

33.7 parts of 2-aminobenzene-5-sulfonic acid phenyl ester-1:2'-dicarboxylic acid are dissolved in 400 parts of water and 8 parts of sodium hydroxide. 6.9 parts of sodium nitrite are added to the solution, and the latter is then slowly introduced in portions at 5–8° C. into 100 parts by volume of a 5N-solution of hydrochloric acid.

Sufficient sodium carbonate is added to the suspension of the diazo compound to produce only a weakly acid reaction to Congo, and the whole is added at 5–10° C. to a solution of 17.4 parts of 1-(4'-chloro)-phenyl-3-methyl-5-pyrazolone in 500 parts of water and 25 parts of sodium carbonate.

The whole is stirred at 8–10° C. until the diazo reaction disappears, the dyestuff is completely precipitated by the addition of sodium chloride, separated by filtration and dried.

The dyestuff is a yellow powder which dissolves in dilute sodium carbonate solution with a yellow coloration, in pure concentrated sulfuric acid with a greenish yellow coloration and dyes wool from an acetic acid bath yellow tints, which when afterchromed are transformed into a very fast brownish yellow. The dyestuff is also excellently suited for dyeing by the single bath chroming process, and in this case also very fast slightly brownish yellow tints are obtained.

In the manner described in this example the 2-aminobenzene-5-sulfonic acid-(4'-methyl)-phenyl ester-1:2'-dicarboxylic acid is obtained from 2-chlorobenzene-5-sulfonic acid chloride-1-carboxylic acid and 4-methyl-1-hydroxybenzene-2'-carboxylic acid.

What we claim is:
1. A compound of the formula

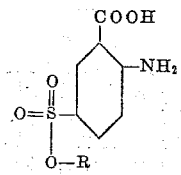

in which R represents a benzene radical containing a carboxy group.

2. The compound of the formula

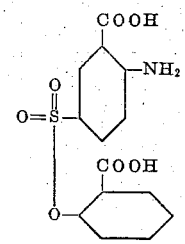

3. The compound of the formula

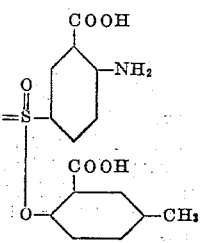

WILLY WIDMER.
ALFRED FASCIATI.

REFERENCES CITED

The following references are of record in the file of this patent:

UNITED STATES PATENTS

| Number | Name | Date |
|---|---|---|
| 1,646,785 | Duisberg | Oct. 25, 1927 |

OTHER REFERENCES

Groggins, Unit Processes in Organic Synthesis, second edition, sixth impression, pp. 200, 201, 309 (1938).